S. E. & M. P. JACKSON.

2 Sheets—Sheet 1.

Mower.

No. 3,460.

Reissued May 25, 1869.

Witnesses:
L. Rowe Hardy
P. B. Giffell.

Inventors:
Silas E. Jackson
Morgan P. Jackson

2 Sheets—Sheet 2

S. E. & M. P. JACKSON.

Mower.

No. 3,460. Reissued May 25, 1869.

Witnesses:
L. Rhoades Hodge
J. B. Giffell.

Inventors:
Alex C. Jackson
Morgan P. Jackson

UNITED STATES PATENT OFFICE

SILAS E. JACKSON AND MORGAN P. JACKSON, OF BOONEVILLE, NEW YORK.

IMPROVEMENT IN MOWING-MACHINES.

Specification forming part of Letters Patent No. 18,975, dated December 29, 1857; reissue No. 3,160, dated May 25, 1869.

*To all whom it may concern:*

Be it known that we, SILAS E. JACKSON and MORGAN P. JACKSON, of Booneville, in the county of Oneida and State of New York, have invented certain new and useful Improvements in Harvesting-Machines; and we do hereby declare the following to be a full, clear, and exact description of the construction and operation of the same, reference being had to the accompanying drawings, making a part of this specification, in which—

Figure 1:
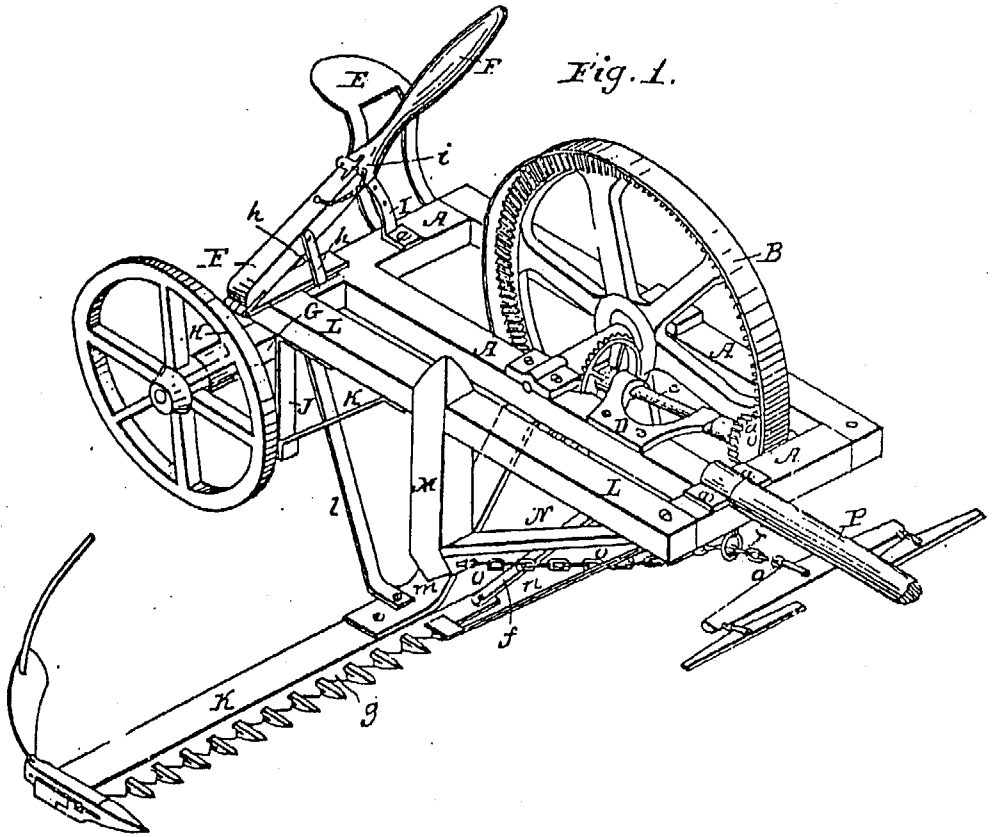
Figure 2:
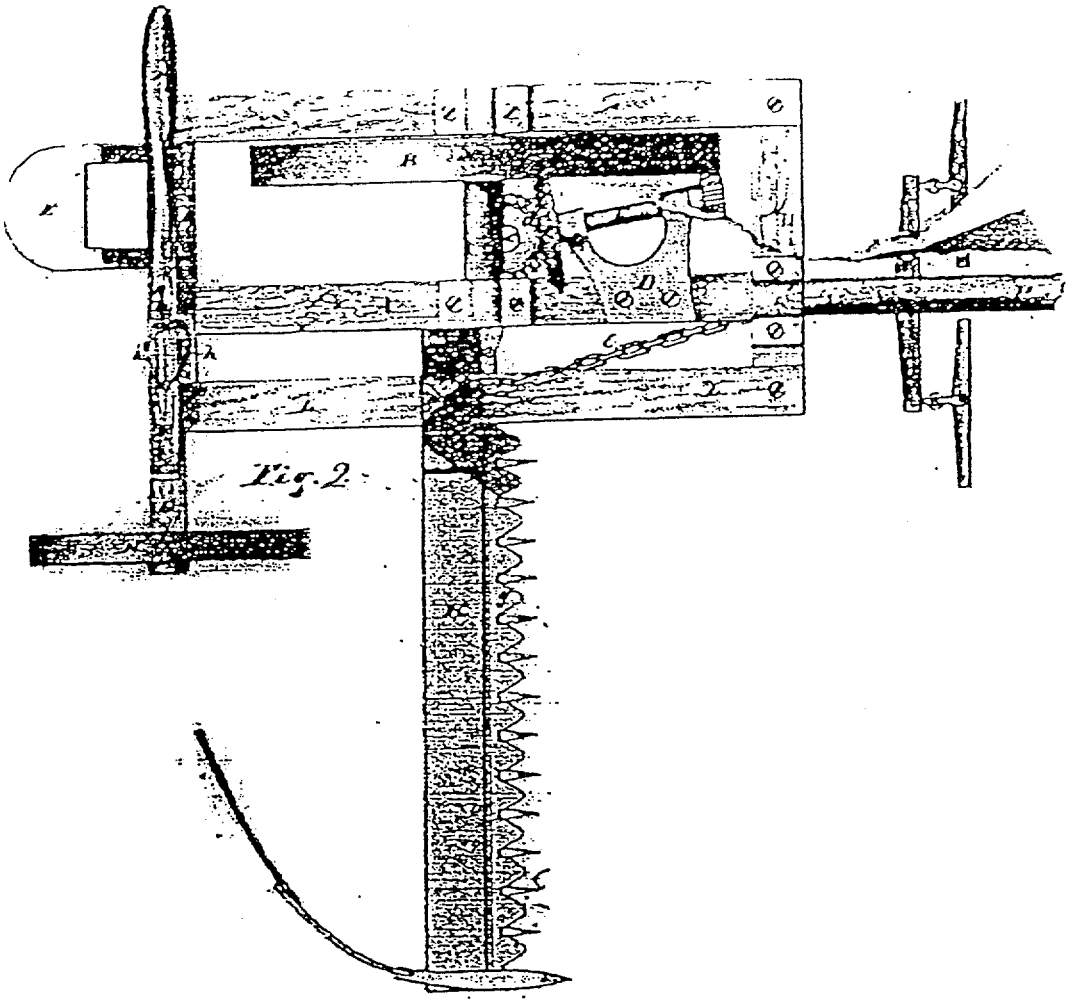

Figure 1 represents the machine in perspective, the pole being shown broken off; and Fig. 2 represents a top or plan view of the machine shown in Fig. 1.

To enable those skilled in the art to which our invention belongs to make and use the same, we will proceed to describe it more in detail.

Many attempts have been made in harvesting-machines to counteract side draft, occasioned by the unequal balance and draft, and though what had already been done may have in a measure remedied the objection, there yet remained much of the difficulty prior to our present improvements, owing to the nature generally used, the work or cutting of the stalks and construction of harvesting-machines, as being done beyond the frame and to one side of it. Tongues with one of their forks extending toward the cutter-bar, iron rods connecting the finger-bar rigidly with the line of draft, and braces have been used to this end.

The error, as we believe, lies in this, that in all the attempts heretofore made, the devices which were designed to remedy the difficulties named above have been either rigidly connected to the tongue, frame, or finger-bar, or their action impeded by restricting their free and untrammeled movement, either of which causes will prevent them from accomplishing the object for which they were designed.

It is obvious that a rigid connection from one part of the machine to the other tends only to make the parts as one. In order that one part of the machine may have a motion independent of the other part or parts it must have no rigid connection therewith, or else the line of draft and the tongue must be independent of each other. Then, again, the action of the gearing in most classes of harvesting-machines tends, by its rotation, to tip the frame forward, thereby causing an increased pressure on the necks of the team, and otherwise increasing the labor of the team in drawing the machine forward.

The term harvester, as used, refers to machines for mowing or cutting grass as well as grain. Such machines are often made simply for mowing grass, although in some parts of the country combined machines are used to a considerable extent.

The nature of our invention consists, first, in counteracting side draft, and restoring the balance of the frame by a flexible draft-connection, which extends from a part of the machine near the heel end of the finger-beam, or the hanger-iron to which it is attached, and below a horizontal plane on a line with the main axle of the machine, to a point underneath and in line with the tongue, as will be hereafter explained; second, in combining with the frame and tongue of a side-draft harvesting-machine, of a draft-connection which is independent of the pole or guiding device, as will be hereinafter explained; third, in combining with the frame and finger-beam of a harvesting-machine, of an oblique flexible draft-connection, independent of the pole or guiding device, as will be hereafter explained; fourth, in the combination, with an independent flexible draft attachment or connection, of a device for supporting the forward end of said draft connection, below the rear end of the tongue, but independent of the same, as and for the purposes hereafter explained; fifth, in the combination of certain particular devices for counteracting side draft and restoring the balance of the machine, as will be hereafter explained.

In the drawings, A represents an ordinary frame suspended from the axle of the main driving and supporting wheel B. A shaft C, is supported on the frame by a plate, D one end of said shaft having a beveled pinion *a*, upon it, which meshes with and receives motion from the gear *b* on the main wheel B The other end of said shaft C has a beveled pinion, *c*, on it, which gears with and gives motion to another similar pinion, *d*, on a vertical shaft, *e*, which is also supported in prope bearings on the frame A. On the lower end of the shaft *c* there is a crank, to which one end of the connecting-rod *f* is attached, the other end being attached to the cutter-bar *g*, whereby a reciprocating motion will be imparted to the cutter *g* from the main wheel B when the machine is drawn forward by the team. On the rear transverse piece of the frame A, at that corner most remote from the standing grass or grain, is fixed the driver's seat E, and at the other end of said piece is hinged a lever, F, which extends from thence to the driver's seat. Underneath the said rear cross-piece of the frame, and about under the driver's seat, an axle, G, is also hinged, which is parallel with the said cross-piece and below it, as the lever F is above said cross-piece; or, in other words, the lever and axle are hinged at opposite corners of the frame, the former above and the latter below, and extend from their hinged points in opposite directions from each other. The axle G has upon it a supporting-wheel, H, and said axle and lever F are connected together by straps *h*, so as to be worked together. I is a curved bar passing through a mortise in the lever F, so that a pin, *i*, may be inserted to hold the lever in any desired adjusted position. J is a guide-piece suspended from the frame, and braced to it by a bar, K. Its object is to keep the axle G in proper line. K is the finger-bar, provided with slotted fingers, and outer and inner shoes, and secured rigidly to the main frame by the braces *l m n*. L is an auxiliary rail connected to the main frame, and, if added when the machine is building, may be of wood, and framed into the end pieces, like the other longitudinal pieces of the frame. But when the frame is already constructed we make the rail L out of a bent bar, united to the ordinary frame at its ends, and bowing out sufficient for the purpose for which it is intended, as will be explained. From the rail or bar L there projects downward, at about the line of the finger-bar, though it may be forward of or behind that line, (particularly the latter,) a stud, M, which is braced from its lower end to the front of the frame by a brace, N. The stud M may be rigidly connected to the rail or bar L, but not necessarily so, as it may be slightly loose thereon, the draft, when on, bringing it against the brace, and the brace against the frame, and this looseness may prevent any injury to the parts by sudden shocks in starting or in striking any obstacle. At the lower end of the stud M there is fastened a draft-chain, O, which extends upward and obliquely forward until it passes through a ring, *r*, on the under side of the front cross-piece of the frame, and about underneath the heel of the tongue P, which is rigid or otherwise, in the usual way; and to the end of this chain is attached the double-trees or whiffletrees, to which the horse or horses are attached.

The ring *r* is not to confine the chain to any specific point in a lateral direction, but to prevent it from falling upon the ground. The draft is on this chain, and is, therefore, against the side draft of the machine, while the horses may walk on either side of the tongue, in the usual way, having the end of the tongue fastened to their collars by breast straps or chains, and thus the machine is drawn by the chain from one point, and that oblique to the line of motion of the machine, while the tongue guides the machine, mainly, however, in turning around, for we have so effectually counteracted said side draft that the machine almost, if not quite, guides itself in a straight line. The tongue, to be sure, defines the position of the horse or horses, but they draw upon the chain which is oblique to that line, and the chain would be at some point underneath the line of the tongue if the ring *r* were removed entirely. The drawing and guiding are, therefore, separate things, although the position of the tongue (for it defines the position of the horses) does, to a certain extent, fix the position of the end of the chain to which the horses are hitched.

The efficiency of the chain or yielding draft-connection, as herein described, for counteracting side draft is exemplified in the act of turning the machine around from the left to the right hand, which is the customary way. When the driver, by the lever F, raises up the rear right-hand corner of the frame, the stud M, which is nearest that corner, is also raised up, and the front and diagonally-opposite corner of the frame is correspondingly lowered, so that the chain approaches more nearly a horizontal position. The horses, now drawing upon the chain, pull it around with scarcely any aid from the tongue, as the line of draft is directly in the circuit in which the machine is turning, and is uninfluenced by the frame or tongue. If the chain were fastened to the tongue this would not be the case, because the machine could not be brought around any faster than the tongue moved around, proving that by such a connection the machine must follow the tongue and not the line of draft.

Then, again, in reference to the balancing of the machine: As the draft-connection is attached to the machine below the main axle, and independent of the tongue, especially in its longitudinal movements, the tendency of the draft is to lift the finger-beam up when the machine is in action, and thus prevent its dragging and pressing so heavily on the ground as it otherwise would, thereby producing two very important results.

In the first place, the less friction there is between the finger-beam, its fingers and shoes, and the ground, the less side draft there will be; and, second, the down pressure on the tongue occasioned by the rotation of the gearing is counterbalanced, whereby the necks of the horses are greatly relieved, thus rendering it much easier for the team to draw the machine forward.

Those accustomed to operate mowing and reaping machines will readily understand the advantages of our invention, last above referred to, since they know by practical tests how severely the tongue and front of the frame are pressed or forced down by the rotation of the gearing in that class of machines in which the tongue is rigidly secured to the frame which supports the gearing, or a great part thereof, especially in cutting lodged and heavy grass and grain.

By our arrangement of a separate draft-connection the power of the team has a tendency to lift up the cutting apparatus, and that, too, without throwing additional weight on the tongue or the necks of the horses.

It will be noticed that by the use of the ring *r* the front end of the yielding draft-connection and the whiffletree devices, to which the team is attached, will be retained in elevated positions under the tongue when the team is stopped, or in backing the machine. Then, again, it will be observed that the yielding draft-connection is such that there is a direct line of draft at all times.

It will be apparent to those skilled in the art of manufacturing mowing and reaping machines that our invention, or parts thereof, may be applied with good results to other machines than the one shown in the drawings.

Having described one practical way in which our invention or improvement in harvesters can be applied to use, what we claim therein as new and of our invention, and desire to secure by Letters Patent, is—

1. The combination, with the cutting apparatus and main frame of a harvesting-machine, of a flexible or yielding draft-connection, which extends from a part of the machine below the main axle and near the heel end of the finger-beam, or the shoe which supports it, to a point underneath and in line with the tongue, but not connected thereto, for the purposes stated.

2. The combination, with the frame, having a laterally-projecting finger-beam of a harvester, of a pole or guiding device, arranged to project forward of the line of cut, and a draft-connection, which is independent of such pole or guiding device of the machine, substantially as and for the purposes stated.

3. The combination, with the frame which supports the finger-beam in a harvesting-machine, of an oblique flexible or yielding draft-connection, but independent, as a draft-connection, from the pole by which the machine is guided, for the purposes stated.

4. The combination, with an independent flexible or yielding draft-connection, substantially as described, of a supporting device for retaining the forward end of said connection and the whiffletree devices in elevated positions under the tongue, but which supporting device does not prevent an independent longitudinal movement of the connection, for the purposes stated.

5. The combination, with the stud M and brace N, of the draft-chain O and ring *r*, substantially as and for the purposes set forth.

SILAS E. JACKSON.
MORGAN P. JACKSON.

Witnesses:
H. R. HADLEY,
P. B. SIPPELL.